US012747802B2

(12) United States Patent
Herrmann et al.

(10) Patent No.: US 12,747,802 B2
(45) Date of Patent: Sep. 29, 2026

(54) FLUID CONTROL ASSEMBLY AND SYSTEM

(71) Applicant: Precision Planting LLC, Tremont, IL (US)

(72) Inventors: Tristan Herrmann, Princeville, IL (US); Jason Stoller, Eureka, IL (US); Ben Schlipf, Tremont, IL (US)

(73) Assignee: Precision Planting LLC, Tremont, IL (US)

(*) Notice: Subject to any disclaimer, the term of this patent is extended or adjusted under 35 U.S.C. 154(b) by 1084 days.

(21) Appl. No.: 17/276,460

(22) PCT Filed: Sep. 14, 2019

(86) PCT No.: PCT/US2019/051204

§ 371 (c)(1),
(2) Date: Mar. 15, 2021

(87) PCT Pub. No.: WO2020/056395

PCT Pub. Date: Mar. 19, 2020

(65) Prior Publication Data

US 2022/0030757 A1 Feb. 3, 2022
US 2026/0201971 A9 Jul. 16, 2026

Related U.S. Application Data

(63) Continuation-in-part of application No. PCT/US2019/020452, filed on Mar. 2, 2019.

(Continued)

(51) Int. Cl.

*F16K 27/00* (2006.01)
*F15B 13/02* (2006.01)

(Continued)

(52) U.S. Cl.

CPC ............ *F16K 27/003* (2013.01); *F15B 13/02* (2013.01); *G05D 7/0652* (2013.01); *A01C 5/068* (2013.01);

(Continued)

(58) Field of Classification Search

CPC .................... F16K 27/003; F15B 13/02; F15B 2211/3056; F15B 2211/6313

See application file for complete search history.

(56) References Cited

U.S. PATENT DOCUMENTS

2004/0055455 A1 3/2004 Tabor et al.
2004/0261608 A1* 12/2004 Bugel .................... G05B 19/43 91/465

(Continued)

FOREIGN PATENT DOCUMENTS

DE 103 15 460 B4 2/2006
DE 102014217181 A1 3/2016

(Continued)

OTHER PUBLICATIONS

USPTO Receiving Office, International Search Report for International Application No. PCT/US2019/051204, mail date Nov. 26, 2019.

*Primary Examiner* — Nathaniel E Wiehe
*Assistant Examiner* — Daniel S Collins

(57) ABSTRACT

A fluid system includes a fluid control assembly in fluid communication with a fluid source in fluid communication with a fluid supply port and the fluid control assembly is in fluid communication with an actuator via an outlet port. A controller controls at least one supply valve and at least one exhaust valve. The at least one supply valve and exhaust valve are in a normally closed position until being actuated by the controller to an open position. The fluid control assembly includes a pressure sensor in communication with the outlet port. Whereby when pressure in the outlet port is less than a predetermined pressure, a controller opens the supply valve to communicate fluid to the actuator via the actuator line and when the pressure in the outlet port is greater than a predetermined pressure the controller opens (Continued)

the exhaust valve to vent the is outside a predetermined range.

8 Claims, 15 Drawing Sheets

Related U.S. Application Data

(60) Provisional application No. 62/840,372, filed on Apr. 29, 2019, provisional application No. 62/791,203, filed on Jan. 11, 2019, provisional application No. 62/731,813, filed on Sep. 14, 2018.

(51) Int. Cl.

| | |
|---|---|
| ***G05D 7/06*** | (2006.01) |
| *A01C 5/06* | (2006.01) |
| *A01C 7/20* | (2006.01) |

(52) U.S. Cl.
CPC ....... *A01C 7/205* (2013.01); *F15B 2211/3056* (2013.01); *F15B 2211/6313* (2013.01)

(56) References Cited

U.S. PATENT DOCUMENTS

| | | | | |
|---|---|---|---|---|
| 2007/0130935 | A1 | 6/2007 | Stephenson et al. | |
| 2014/0158215 | A1 | 6/2014 | Maichl et al. | |
| 2014/0290545 | A1 | 10/2014 | Van Buskirk et al. | |
| 2017/0215334 | A1 | 8/2017 | Dienst et al. | |
| 2018/0000001 | A1* | 1/2018 | Bassett | A01B 61/044 |

FOREIGN PATENT DOCUMENTS

| | | | |
|---|---|---|---|
| WO | 2004097227 | A1 | 11/2004 |
| WO | 2007110488 | A1 | 10/2007 |
| WO | 2019072930 | A1 | 4/2019 |

* cited by examiner (Increase Downforce)

(Increase Upforce)

(Increase Downforce)

(Decrease Downforce)

(Increase Downforce)

(Increase Upforce)

(Increase Downforce)

(Decrease Downforce)

FLUID CONTROL ASSEMBLY AND SYSTEM

CROSS-REFERENCE TO RELATED APPLICATIONS

This application claims the benefit of U.S. Provisional Patent Application Nos. 62/731,813 filed Sep. 14, 2018; 62/791,203 filed Jan. 11, 2019 and 62/840,372 filed Apr. 29, 2019, and International Patent Application No. PCT/US2019/020452 filed Mar. 1, 2019, each of which is hereby incorporated in its entirety by reference into this application.

DESCRIPTION

Figure 1:
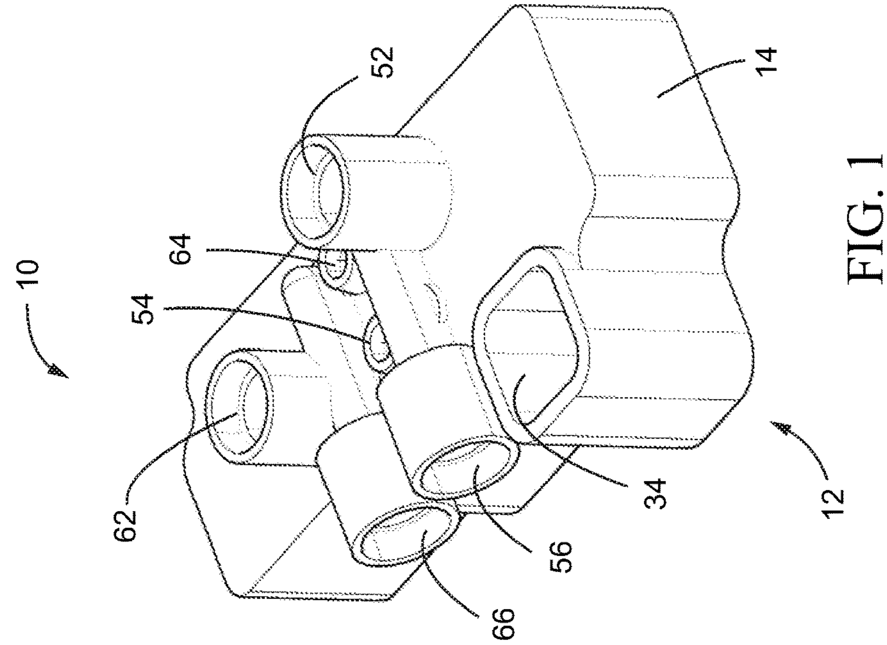
FIG. 1 is a top perspective view of an embodiment of a fluid control assembly.
Figure 2:
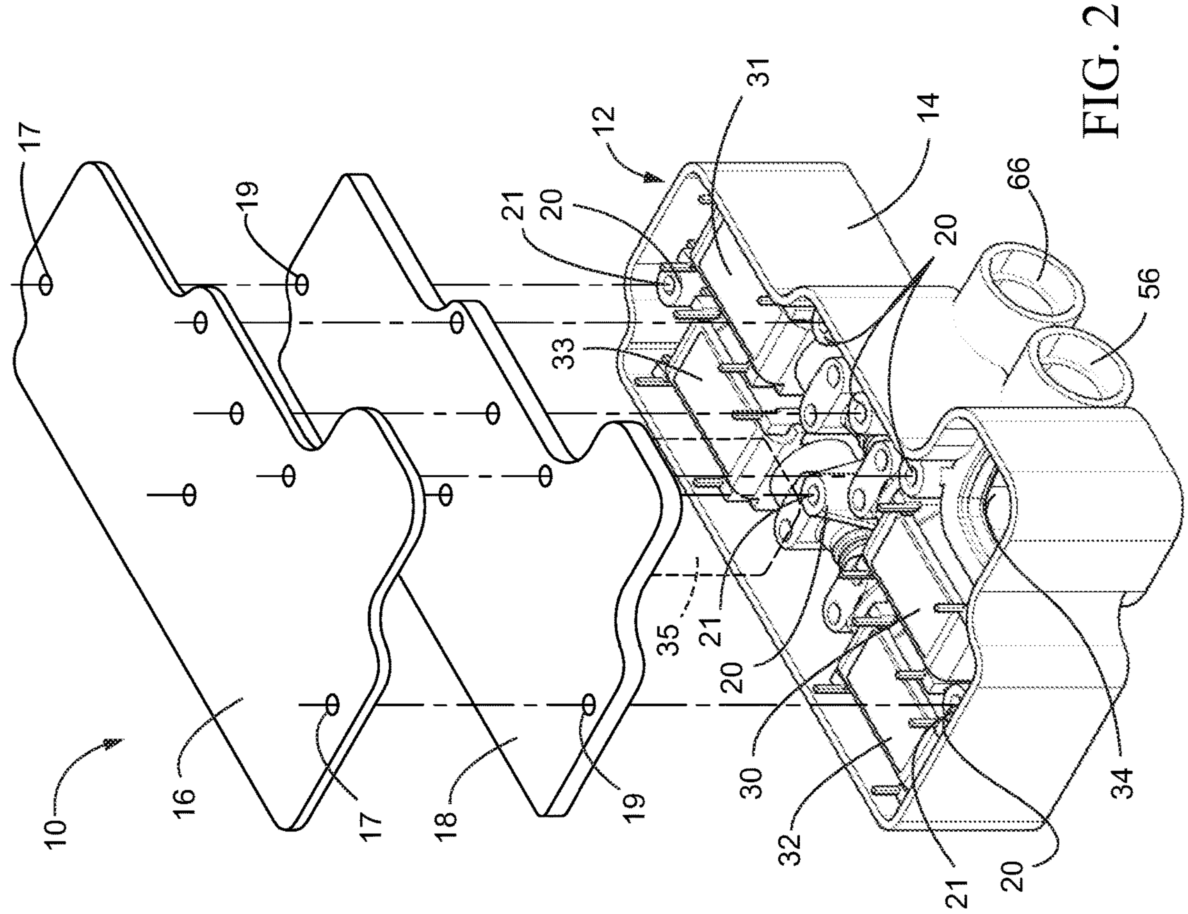
FIG. 2 is an exploded bottom perspective view of the fluid control assembly of FIG. 1.

Referring now to the drawings, wherein like reference numerals designate identical or corresponding parts throughout the several views, FIG. 1 shows a top perspective view of an embodiment of a fluid control assembly 10, for which exemplary uses are described later. FIG. 2 shows an exploded bottom perspective view of the fluid control assembly 10 of FIG. 1. The term "fluid" as used herein is intended to encompass any type of gas, including, but not limited to, air, nitrogen, and carbon dioxide. Accordingly, although the term "air" may be identified in some of the drawings referred to herein in connection with descriptions of the exemplary embodiments, systems and uses disclosed, it should be understood that the fluid control assembly 10 and the systems and uses disclosed herein may be used with any fluid as defined above.

The fluid control assembly 10 includes a housing 12 which comprises a top cover 14 and a bottom plate 16. A plurality of valves 30, 31, 32, 33 (FIGS. 2-4) are mounted to a circuit board 18 received within the top cover 14. As best viewed in FIG. 4, the bottom plate 16 and circuit board 18 include aligned apertures 17, 19 which further align with apertures 21 within posts 20 extending downward from the underside of the top cover 12. Threaded connectors (not shown) extend through the apertures 17, 19 and into aperture 21 to secure the bottom plate 16 and circuit board 18 to the top cover 14 thereby enclosing the circuit board 18 and valves 30, 31, 32, 33 within the housing 12.

The top cover 14 includes a communication port 34 for providing data/signal connection with the circuit board 18. The communication port 34 may receive a connector 35 on the circuit board 18 for mating with a mating connector (not shown) for signal communication with a remote controller 110 (discussed later). The communication port 34 may be for a 6-pin DT connector, Controller Area Network (CAN) bus connector, USB, Ethernet, RS-232 or any other type of data/signal connector.

The top cover 14 also includes first and second fluid inlet ports 52, 62, first and second exhaust ports 54, 64 and first and second fluid outlet ports 56, 66. As best viewed in FIG. 4, the top cover 14 also includes a down pressure sensor tube 68 in communication with the first fluid outlet port 56 and a lift pressure sensor tube 70 in communication with the second fluid outlet port 66. The down pressure sensor tube 68 aligns with and provides communication with a down pressure sensor 69 disposed on the circuit board 18 to detect fluid pressure within the first fluid outlet port 56, for purposes discussed later. Similarly, the lift pressure sensor tube 70 aligns with and provides communication with a lift pressure sensor 71 disposed on the circuit board 18 to detect pressure within the second fluid outlet port 66, for purposes discussed later.

Figure 5:
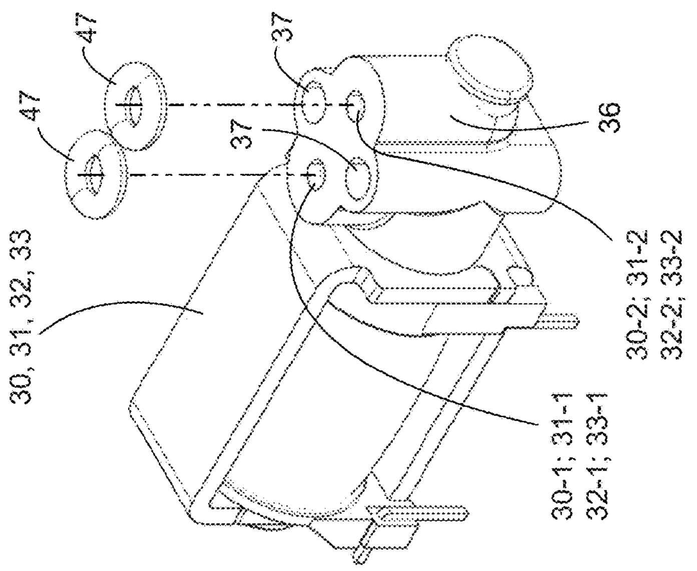
FIG. 5 is an enlarged view of an embodiment of a valve comprising fluid control assembly of FIG. 1.

Referring to FIG. 5, each of the valves 30, 31, 32, 33 includes a fixture 36 at one end having a pair of longitudinally aligned valve passages (designated by reference "X-1" or "X-2" where "X" is a variable corresponds to each of the respective valves 30, 31, 32, 33). The valves 30, 31, 32, 33 may be 2-way pneumatic valves from Asco Valve, Inc., 160 Park Avenue, Florham Park, NJ, 07932 which are in the normally closed position (i.e., so fluid cannot pass between the passages X-1, X-2 of the valve) until energized or actuated, causing the valve to open (i.e., so that fluid may pass between passages X-1, X-2 of the valve). The upper end of the fixture 36 also includes alignment holes 37 for alignment with the pegs 38 (FIG. 4) on the underside of the top cover 14 to ensure proper alignment of the valve passages X-1, X-2 with the corresponding openings of each of the ports 52, 54, 56, 62, 64, 66 in the top cover 14. A gasket 47 is disposed over the valve passages X-1, X-2 and seats within the recesses 39 (FIG. 4) in the underside of the top cover 14 surrounding each opening associated with each of the ports 52, 54, 56, 62, 64, 66 thereby providing an airtight seal between the valve passages and the aligned port openings.

Figure 3:
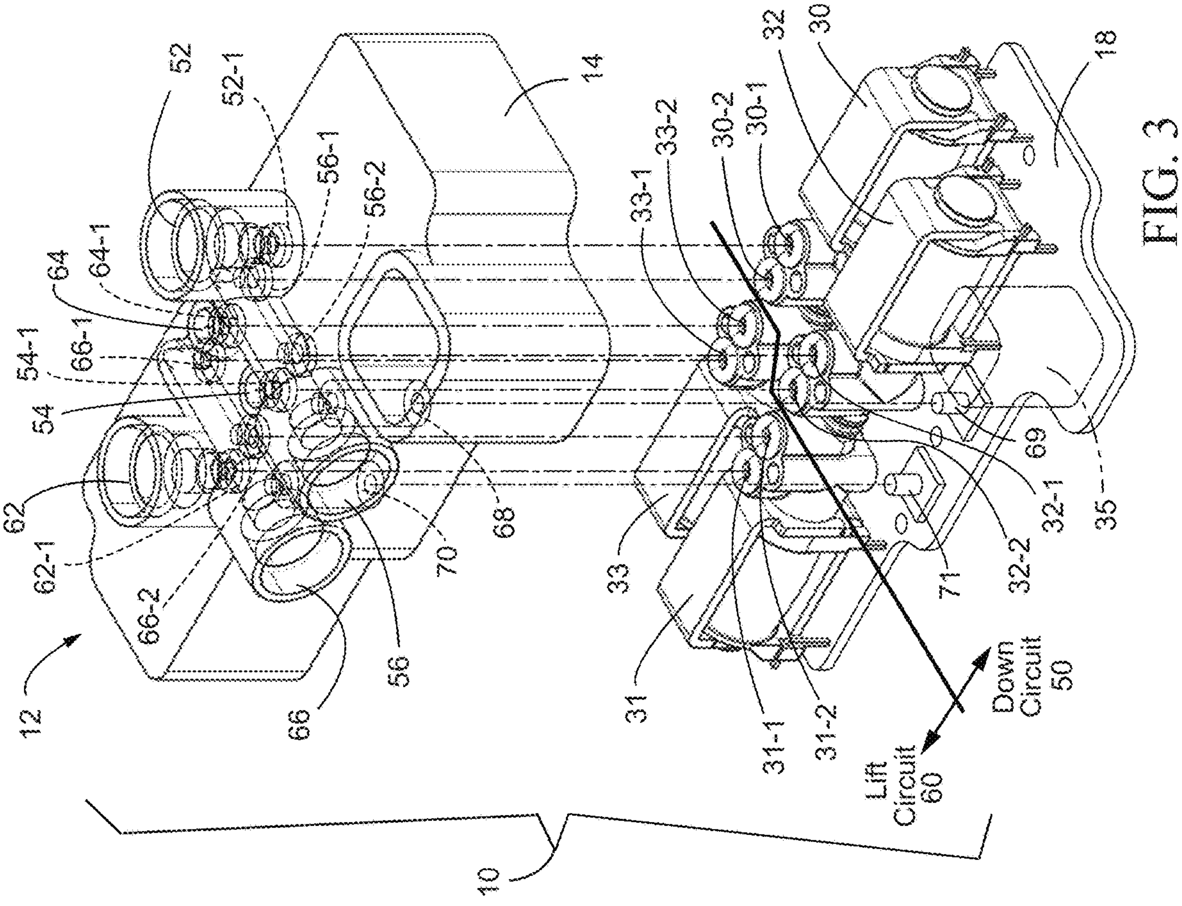
FIG. 3 is an exploded top perspective view of the fluid control assembly of FIG. 1.

Referring to FIG. 3, the fluid control assembly 10 is divided into a down circuit 50 and a lift circuit 60.

Down Circuit

The down circuit 50 comprises the first fluid inlet port 52, the first exhaust port 54, the first fluid outlet port 56, a first fluid supply valve 30, a first fluid exhaust valve 32, the down pressure sensor tube 68, and the down pressure sensor 69.

Figure 4:
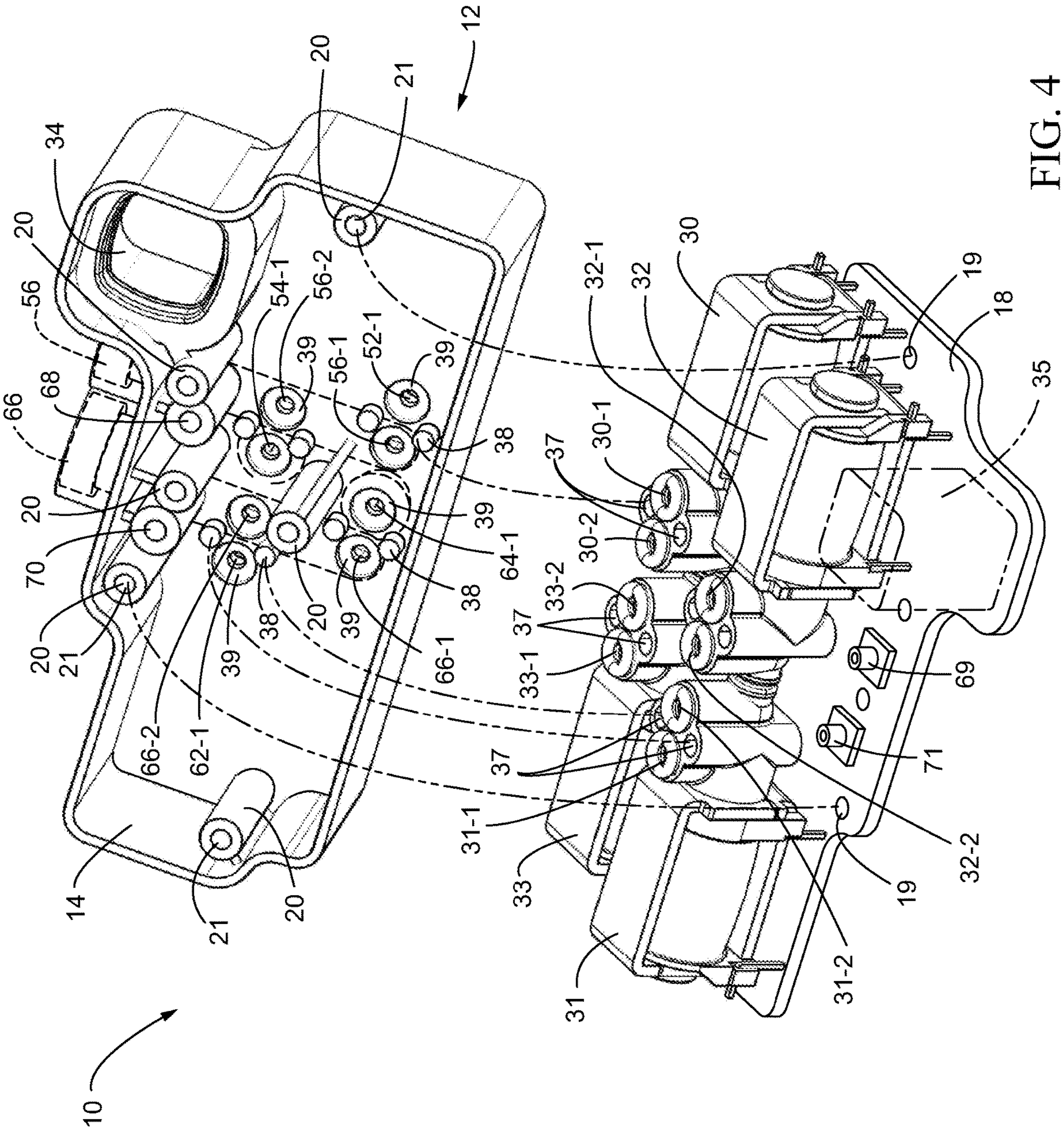
FIG. 4 is an exploded bottom perspective view of the fluid control assembly of FIG. 1 showing the underside of the fluid control assembly housing.

Referring to FIGS. 3 and 4, in the down circuit 50, the valve passage 30-1 of the first fluid supply valve 30 aligns with the opening 52-1 at the bottom of the first fluid inlet port 52. The other valve passage 30-2 of the first fluid supply valve 30 aligns with the first opening 56-1 of the first fluid outlet port 56. The valve passage 32-1 of the first fluid exhaust valve 32 aligns with the second opening 56-2 of the first fluid outlet port 56. The other valve passage 32-2 of the first fluid exhaust valve 32 aligns with the opening 54-1 of the first exhaust port 54.

Lift Circuit

The lift circuit 60 comprises the second inlet port 62, the second exhaust port 64, the second outlet port 66 a second fluid supply valve 31, a second fluid exhaust valve 33, the lift pressure sensor tube 70, and the lift pressure sensor 71.

Referring to FIGS. 3 and 4, in the lift circuit 60, the valve passage 31-1 of the second fluid supply valve 31 aligns with the opening 62-1 at the bottom of the first fluid inlet port 62. The other valve passage 31-2 of the second fluid supply valve 31 aligns with the second opening 66-2 of the second fluid outlet port 66. The first valve passage 33-1 of the second fluid exhaust valve 33 has aligns with the first opening 66-1 of the second fluid outlet port 66. The other valve passage 33-2 of the second fluid exhaust valve 33 aligns with the opening 64-1 of the second exhaust port 64.

Systems and Operation Overview

The operation of the fluid control assembly 10 is described below and schematically illustrated in connection with different fluid system configurations as shown in FIGS. 6A-8B. In each of the configurations, the fluid system comprises the fluid control assembly 10 in communication with a fluid source 80 and one or more pneumatic actuators 90. The fluid source 80 may be a fluid tank with a compressor or other suitable fluid source under pressure. The pneumatic actuator 90 may be a fluid cylinder or a fluid bag. The pneumatic actuator 90 is schematically illustrated as having one end supported by a fixed or non-movable bracket, arm or frame member 97 with the other end connected to a movable bracket or arm 99 that moves or pivots in response to a downforce or upforce applied by the pneumatic actuator 90. The circuit board 18 includes an electrical trace or signal path 83 between the communication port 34/connector 35 and each of the valves 30, 31, 32, 33 for signal communication therebetween. The circuit board 18 also includes electrical traces 85, 87 between the communication port 34/connector 35 and the respective down pressure sensor 69 and lift pressure sensor 71 for signal communication therebetween. In some embodiments, all processing of signals for control of the valves 30, 31, 32, 33 may be performed by a processor on the circuit board 18. In other embodiments, a data/signal line 89 may connect a remote controller 110 to the communication port 34/connector 35 for signal communication of the remote controller 110 with the pressure sensors 69, 71 and valves 30, 31, 32, 33. In yet another alternative embodiment, a closed loop control may be used to control the pressure in the down circuit 50 and lift circuit 60 to selected values set by an operator. In such an embodiment, the selected value may be a selected amount of pressure in the outlet ports 56, 66, or the selected value may be a predetermined position of the movable member 99 detected by a position sensor (not shown) disposed detect the position of the movable member 99.

Figure 6A:
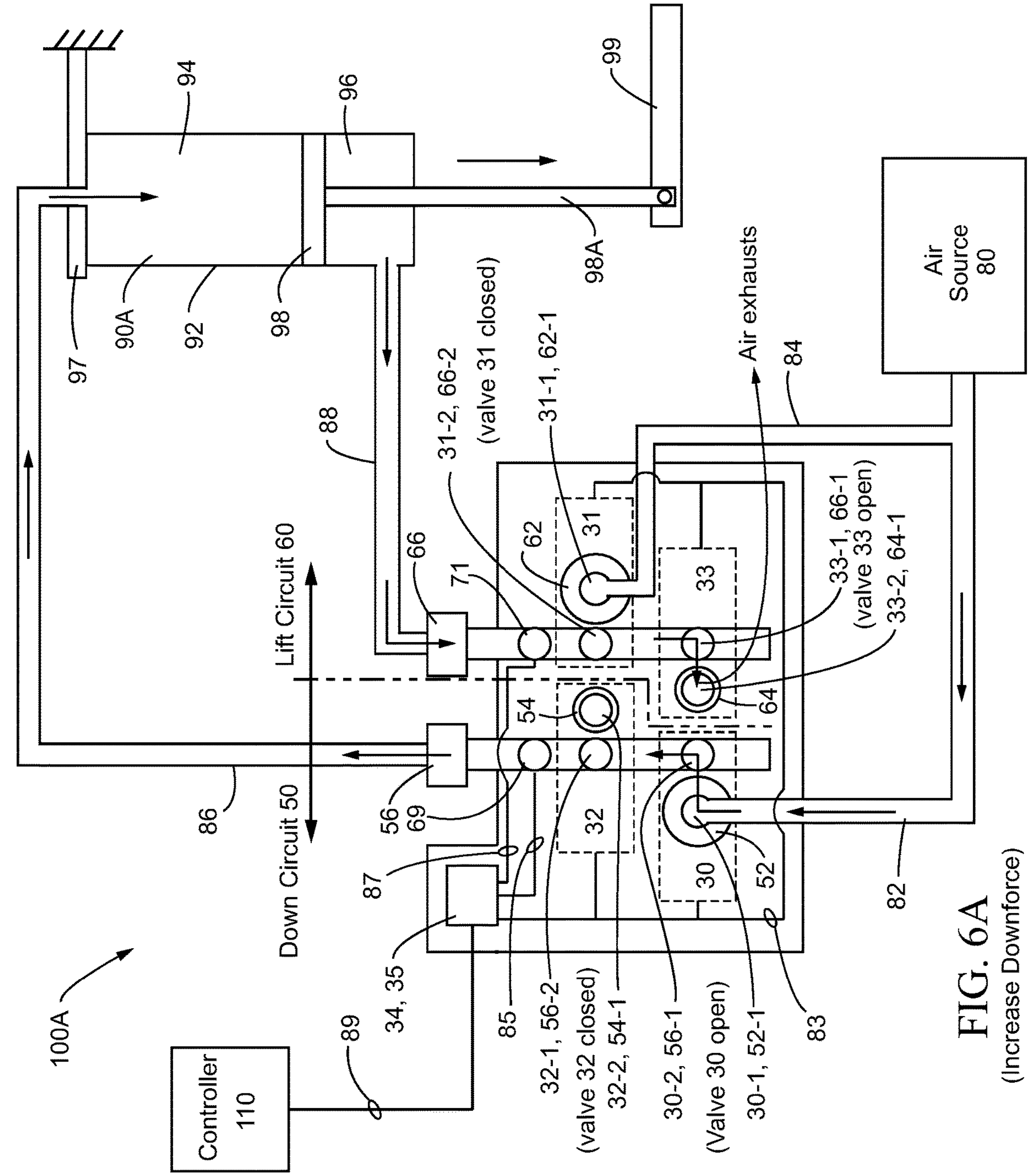
FIGS. 6A and 6B schematically illustrate the operation of a fluid system in which the fluid control assembly of FIG. 1 controls a fluid cylinder to increase downforce and upforce, respectively.
Figure 6B:
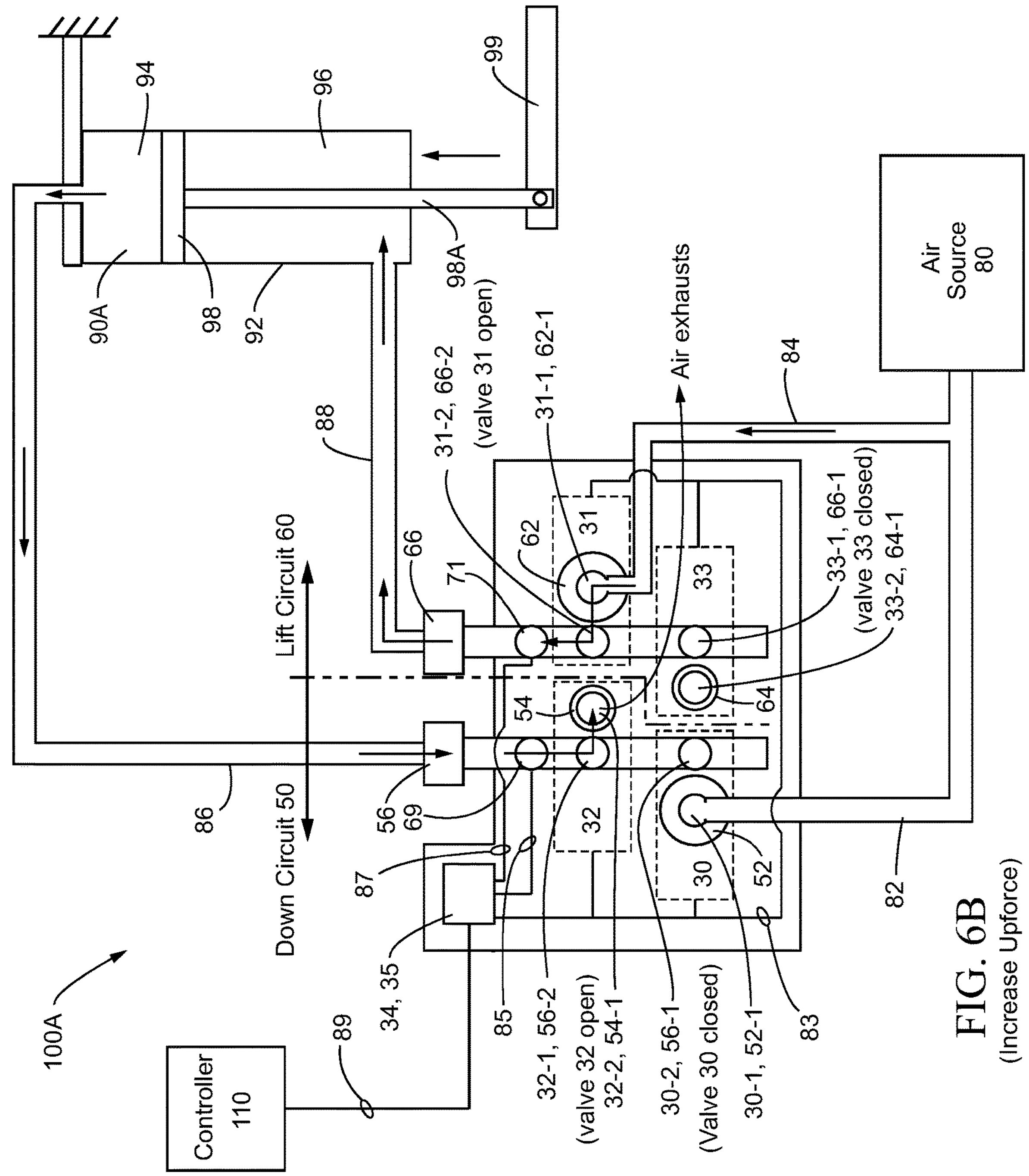

Referring to FIGS. 6A-6B a system 100A is shown in which the inlet port 52 of the down circuit 50 of the fluid control assembly 10 is in communication with a fluid source 80 via down circuit supply line 82. The inlet port 62 of lift circuit 60 is in communication with the fluid source 80 by a lift circuit supply line 84. A down circuit actuator line 86 is connected between the down circuit outlet port 56 and a down chamber 94 of a pneumatic actuator 90A. A lift circuit actuator line 88 is connected between the lift circuit outlet port 66 and a lift chamber 96 of the pneumatic actuator 90A. In this embodiment, the pneumatic actuator 90A comprises a fluid cylinder having a barrel 92 with an internal piston 98 from which extends a piston rod 98A. The area of the barrel 92 above the piston 98 defines the down chamber 94. The area of the barrel below the piston 98 defines the lift chamber 96. The piston rod 98A is pivotally connected to the movable arm 99.

In operation, referring to FIG. 6A, if the down pressure sensor 69 detects that the pressure in the down circuit actuator line 86 is below a predetermined or selected pressure, a signal is generated to open the first fluid supply valve 30 (as previously discussed all valves 30, 31, 32, 33 are normally in the closed position). With the first fluid supply valve 30 open, the pressurized fluid from the fluid source 80 passes through the supply line 82, and into inlet port opening 52-1, then the first and second valve passages 30-1, 30-2 and then into opening 56-2, then out through the down circuit outlet port 56 and through the down circuit actuator line 86 into the down chamber 94 which forces the piston 98 and movable arm 99 downwardly. As the piston 98 moves downwardly, the pressure in the lift circuit actuator line 88 increases. When the lift pressure sensor 71 detects that the pressure in the lift circuit actuator line 88 exceeds a predetermined or set pressure, a signal is generated to open the second exhaust valve 33 permitting fluid to exhaust from the lift chamber 96 through the lift circuit actuator line 88 and lift circuit outlet port 66, then through passages 33-1, 33-2 of the second exhaust valve 33 and the exhaust port opening 64-1 before venting to atmosphere. When the down pressure sensor 69 detects that the pressure in the down circuit actuator line 86 reaches the predetermined or set pressure, a signal is generated to close the previously opened valves 30, 33.

As shown in FIG. 6B, if the lift pressure sensor 71 detects that the pressure in the lift circuit actuator line 88 is below a predetermined or selected pressure, a signal is generated to open the second fluid supply valve 31 from its normally closed position. With the second fluid supply valve 31 open, the pressurized fluid from the fluid source 80 passes through the second supply line 84, and into inlet port opening 62-1, then the first and second valve passages 31-1, 31-2 and then into opening 66-2, then out through the lift circuit outlet port 66 and through the lift circuit actuator line 88 into the lift chamber 96 which forces the piston 98 and movable arm 99 upwardly. As the piston 98 moves upwardly, the pressure in the down circuit actuator line 86 increases. When the down pressure sensor 69 detects that the pressure in the down circuit actuator line 86 exceeds a predetermined or set pressure, a signal is generated to open the first exhaust valve 32 permitting fluid to exhaust from the down chamber 94 through the down circuit actuator line 86 and down circuit outlet port 56, then through passages 32-1, 32-2 of the first exhaust valve 32 and the exhaust port opening 54-1 before venting to atmosphere. When the lift pressure sensor 71 detects that the pressure in the lift circuit actuator line 86 reaches the predetermined or set pressure, a signal is generated to close the previously opened valves 31, 32.

Figure 7A:
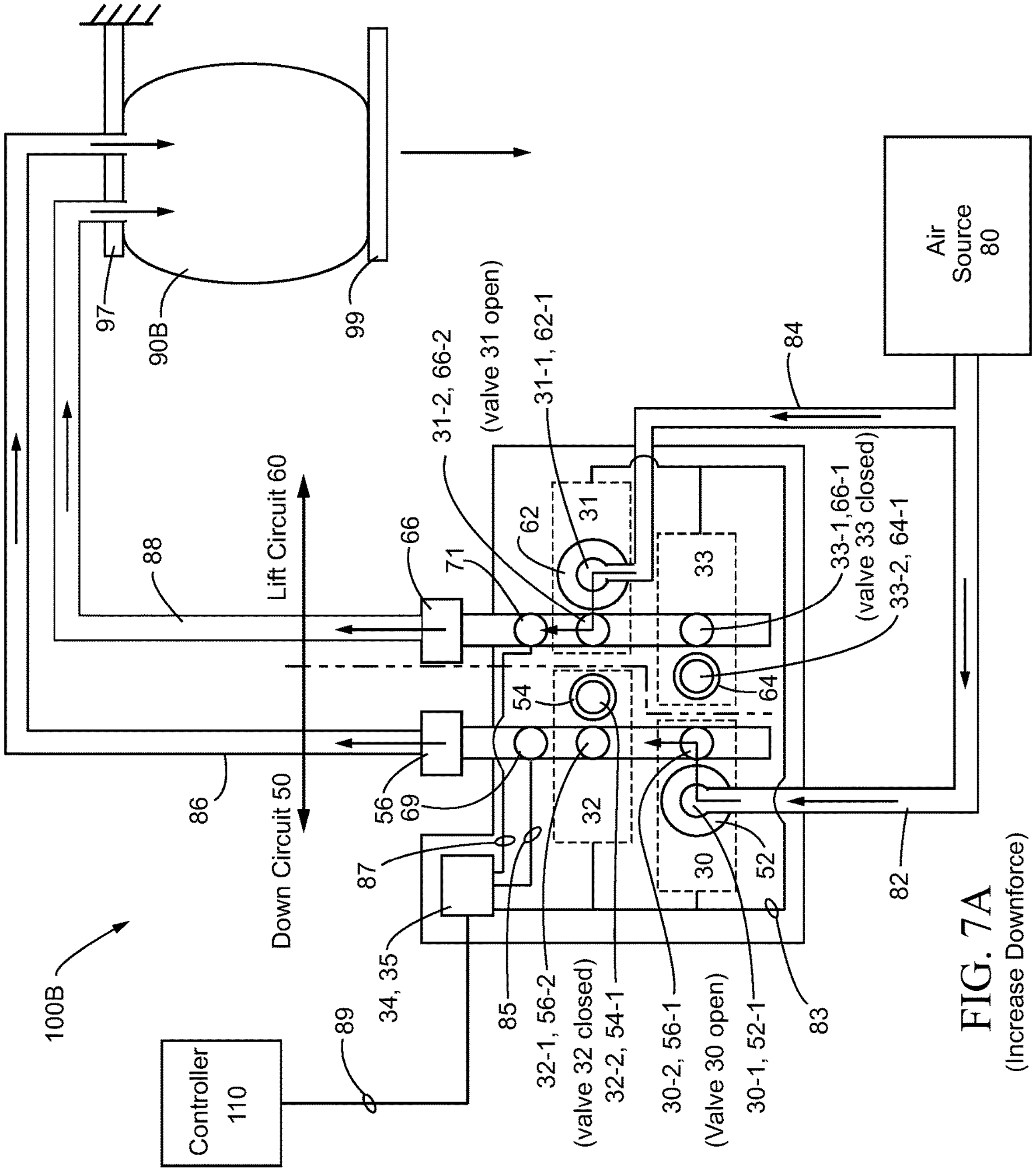
FIGS. 7A and 7B schematically illustrate the operation of a fluid system in which the fluid control assembly of FIG. 1 controls an airbag to increase and decrease downforce, respectively.
Figure 7B:
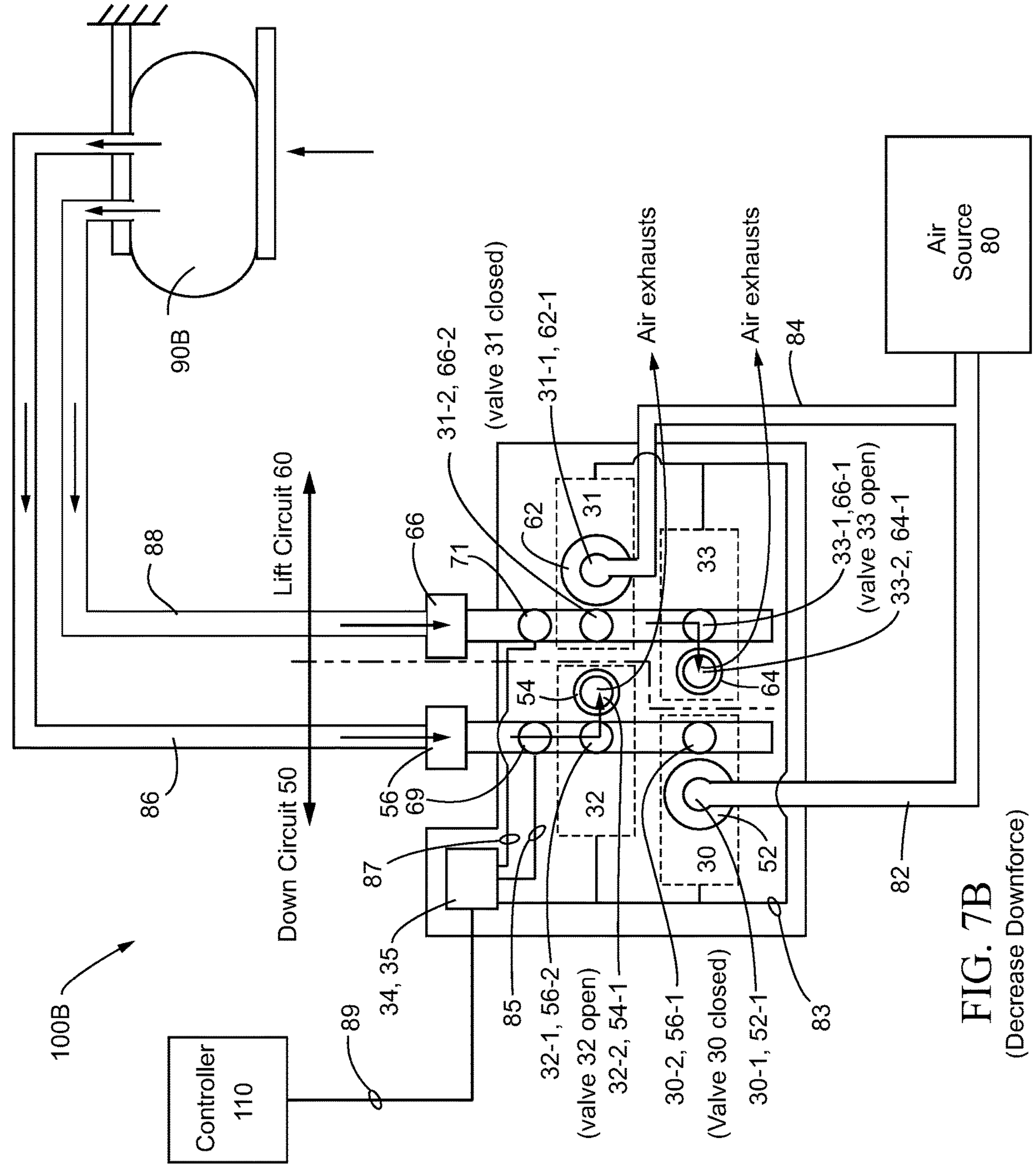

FIGS. 7A-7B schematically illustrate another embodiment of a fluid system 100B. The configuration of the system 100B is similar to that of system 100A, except that the pneumatic actuator 90 is an airbag 90B, which has only a single chamber. One end of the airbag 90B is mounted to the fixed or stationary bracket 97. The other end of the airbag 90B is secured to the movable arm 99. Comparing FIGS. 7A and 7B, it can be seen that when the fluid bag is expanded (FIG. 7A) the expansion of the airbag forces the movable arm downwardly. When the airbag collapses or compresses (FIG. 7B), the movable arm 99 moves upwardly.

In operation, referring to FIG. 7A, if the down pressure sensor 69 detects that the pressure in the down circuit out line 86 is below a predetermined or selected pressure, a signal is generated to open the first and second fluid supply valves 30, 31. With the first and second fluid supply valves 30, 31 open, the pressurized fluid from the fluid source 80 passes through the respective supply lines 82, 84 and into the respective inlet port openings 52-1, 62-1 and the respective first and second valve passages 30-1, 30-2, 31-1, 31-2 and then into the respective openings 56-2, 66-2 then out through the down circuit and lift circuit outlet ports 56, 66 and through the respective actuator line 86, 88 into the fluid bag 90B, causing the airbag 90B to expand forcing movable arm 99 downwardly. When the down pressure sensor and lift pressure sensor 71 detect that the pressure in the respective lines 86, 88 exceeds a predetermined or set pressure, a signal is generated to close both supply valves 30, 31.

As shown in FIG. 7B, if the down pressure sensor 69 detects that the down pressure in the down circuit actuator line 86 exceeds a predetermined or selected pressure, a signal is generated to open the first and second exhaust valves 32, 33 from their normally closed position. With the first and second exhaust valves 32, 33 open, permitting fluid to exhaust from the airbag through the respective actuator lines 86, 88 and outlet ports 56, 66, then through passages 32-1, 32-2, 33-1, 33-2 of the first and second exhaust valves 32, 33 and the respective exhaust port openings 54-1, 64-1 before venting to atmosphere. When the down pressure sensor 69 detects that the pressure in the down circuit actuator line 86 reaches the predetermined or set pressure, a signal is generated to close both exhaust valves 32, 33.

It should be appreciated that instead of both supply valves 30, 31 opening to permit fluid to expand the airbag 90B and both exhaust valves 32, 33 opening to permit fluid to escape the airbag 90B, only one of the supply valves and only one of the exhaust valves need to be opened at one time, but it would take longer to expand or collapse the airbag.

Figure 8A:
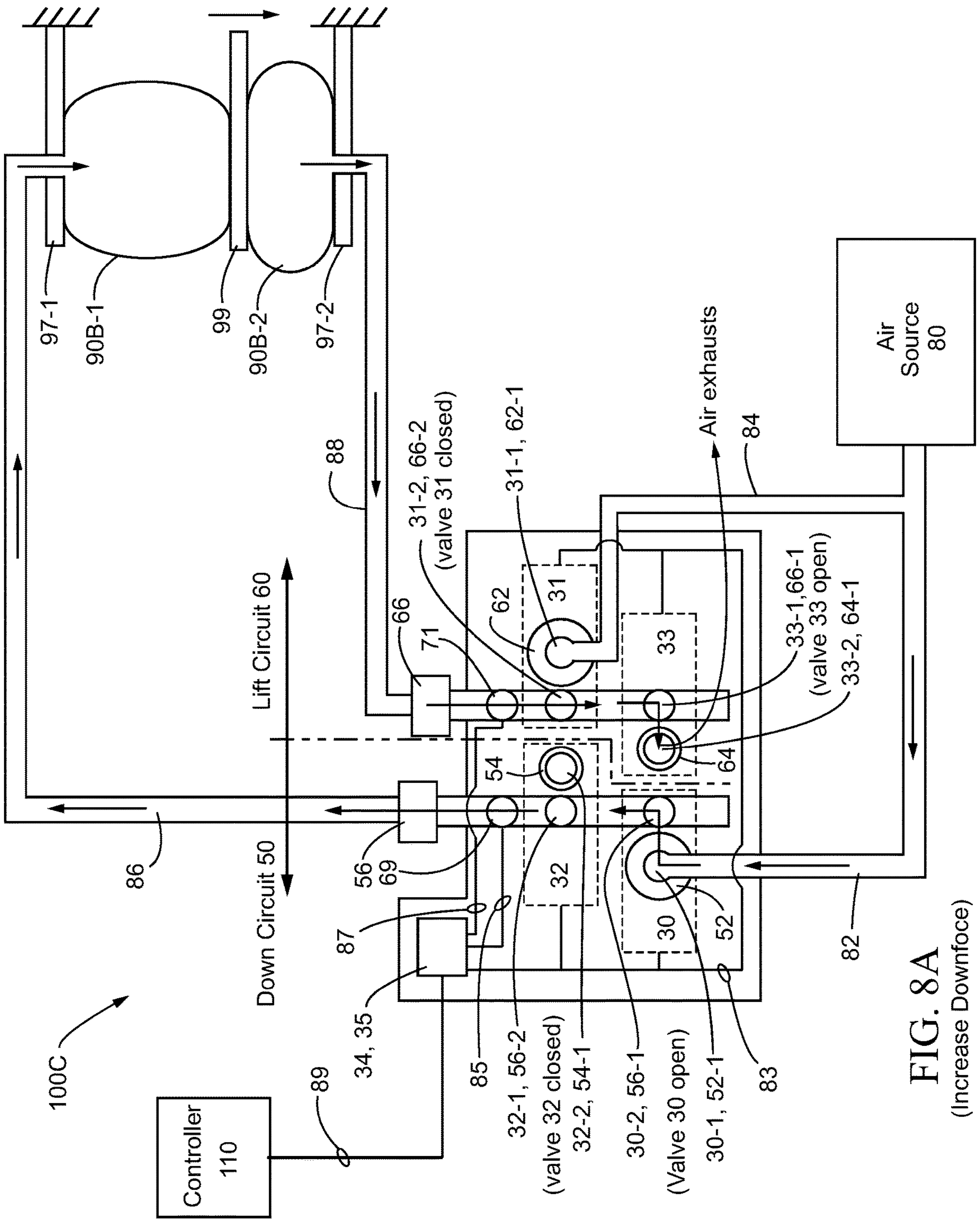
FIGS. 8A and 8B schematically illustrate the operation of a fluid system in which the fluid control assembly of FIG. 1 controls a pair of airbags to increase downforce and upforce, respectively.
Figure 8B:
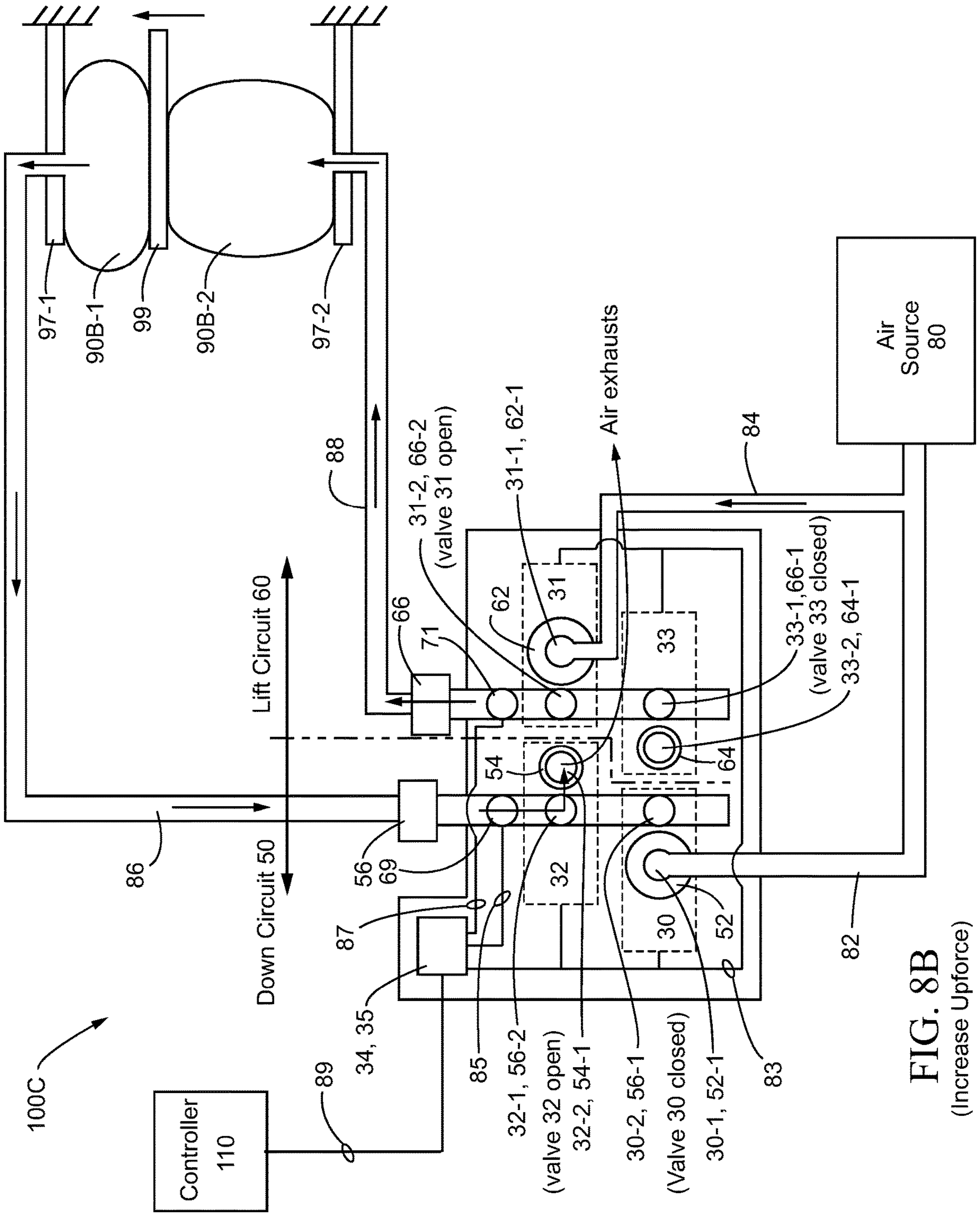

FIGS. 8A-8B schematically illustrate another embodiment of a fluid system 100C. In this embodiment, two airbags 90B-1, 90B-2 are stacked with the movable arm 99 disposed between the airbags 90B-1, 90B-2 and the other end of both airbags secured to a fixed or non-moving brackets 97-1, 97-2. In effect, the two stacked airbags 90B-1, 90B-2 with the movable arm 99 between them operate and function substantially the same as the down chamber and lift chambers of the system 100A.

Accordingly, in operation, referring to FIG. 8A, if the down pressure sensor 69 detects that the pressure in the down circuit actuator line 86 is below a predetermined or selected pressure, a signal is generated to open the first fluid supply valve 30. With the first fluid supply valve 30 open, the pressurized fluid from the fluid source 80 passes through the supply line 82, and into inlet port opening 52-1, then the first and second valve passages 30-1, 30-2 and then into opening 56-2, then out through the down circuit outlet port 56 and through the down circuit actuator line 86 into the upper airbag 90B-1 which causes the upper airbag 90B-1 to expand and causes the lower airbag 90B-2 to collapse, forcing the movable arm 99 downwardly. As the lower airbag 90B-2 collapses, the pressure in the lift circuit actuator line 88 increases. When the lift pressure sensor 71 detects that the pressure in the lift circuit actuator line 88 exceeds a predetermined or set pressure, a signal is generated to open the second exhaust valve 33 permitting fluid to exhaust from the lower airbag 90B-2 through the lift circuit actuator line 88 and lift circuit outlet port 66, then through passages 33-1, 33-2 of the second exhaust valve 33 and the second exhaust port opening 64-1 before venting to atmosphere. When the down pressure sensor 69 detects that the pressure in the down circuit actuator line 86 reaches the predetermined or set pressure, a signal is generated to close the previously opened valves 30, 33.

As shown in FIG. 8B, if the lift pressure sensor 71 detects that the pressure in the lift circuit actuator line 88 is below a predetermined or selected pressure, a signal is generated to open the second fluid supply valve 31 from its normally closed position. With the second fluid supply valve 31 open, the pressurized fluid from the fluid source 80 passes through the second supply line 84, and into inlet port opening 62-1, then the first and second valve passages 31-1, 31-2 and then into opening 66-2, then out through the lift circuit outlet port 66 and through the lift circuit actuator line 88 into the lower airbag 90B-2 which causes the lower airbag 90B-2 to expand and causes the upper airbag 90B-1 to collapse, forcing the movable arm 99 upwardly. As the upper airbag 90B-1 collapses, the pressure in the down circuit actuator line 86 increases. When the down pressure sensor 69 detects that the pressure in the down circuit actuator line 86 exceeds a predetermined or set pressure, a signal is generated to open the first exhaust valve 32 permitting fluid to exhaust from the upper airbag 90B-1 through the down circuit actuator line 86 and down circuit outlet port 56, then through passages 32-1, 32-2 of the first exhaust valve 32 and the first exhaust port opening 54-1 before venting to atmosphere. When the lift pressure sensor 71 detects that the pressure in the lift circuit actuator line 88 reaches the predetermined or set pressure, a signal is generated to close the previously opened valves 31, 32.

Exemplary Uses

Figure 9:
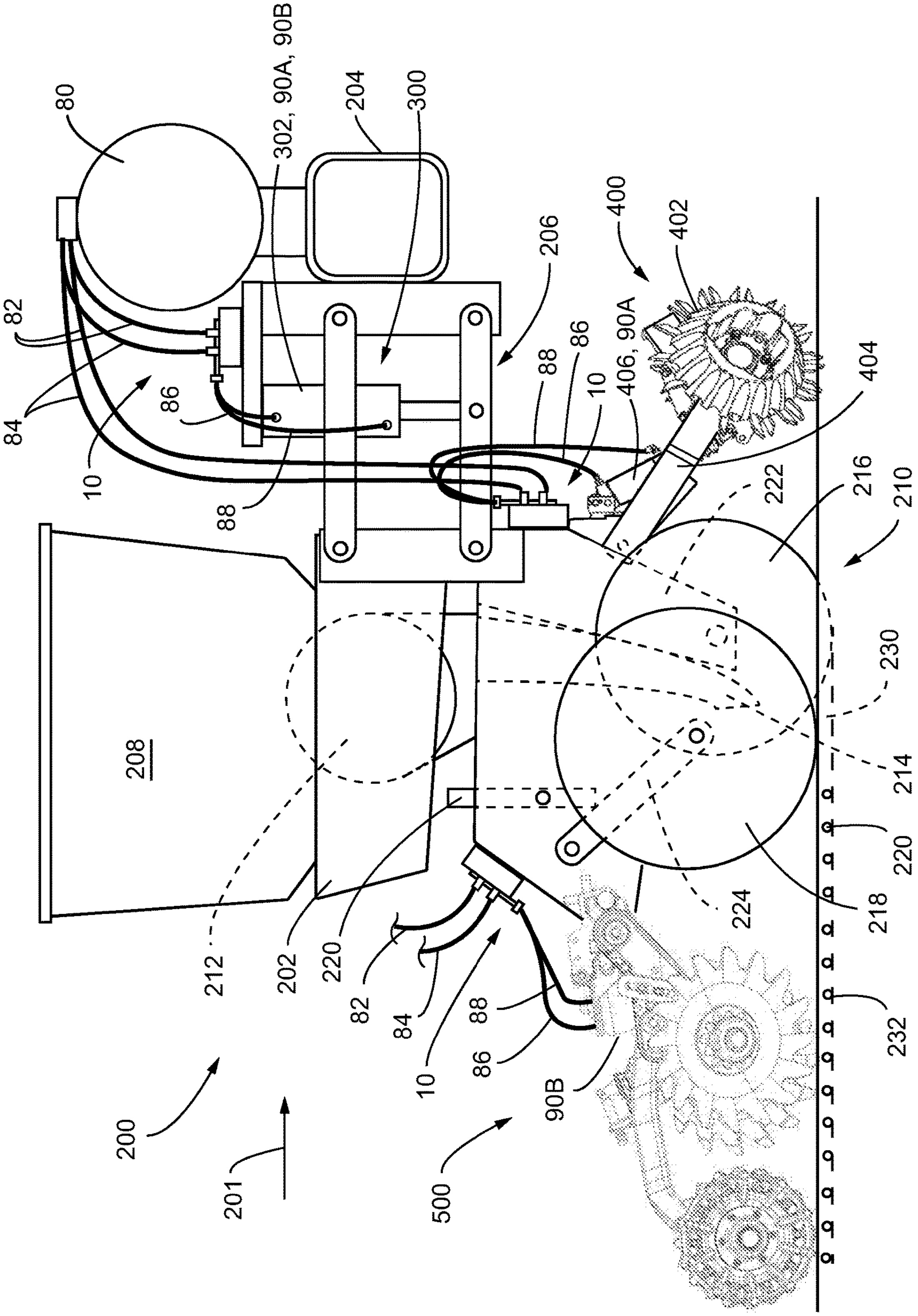
FIG. 9 is a side elevation view of an embodiment of a row unit of an agricultural planter showing an embodiment of a row cleaner assembly, an embodiment of a downforce assembly and an embodiment of a closing wheel assembly, each of which may be operated by the fluid control assembly of FIG. 1.

FIG. 9 is a side view of a row unit 200 of an agricultural planter which moves in a direction of travel indicated by arrow 201. The row unit 200 includes a row unit frame 202 supported from a transverse toolbar 204 by a parallel linkage 206 which permits the row unit frame 202 to move vertically independently of the toolbar 204. The row unit frame 202 supports a seed hopper 208, a seed trench opening assembly 210, a seed meter 212 and a seed tube or seed conveyor 214. As is conventional, the seed trench opening assembly 210 comprises opening disks 216, gauge wheels 218 and a depth adjustment mechanism 220. The opening disks 216 are rotatably supported on a downwardly extending shank 222 of the row unit frame 202. The gauge wheels 218 are pivotally supported from the row unit frame 202 by gauge wheel arms 224. In operation, as the row unit 200 travels in the forward direction of travel, the opening disks 216 form a seed trench 230 in the soil. The seed meter 212 discharges seeds 232 which are deposited in the open seed trench 220 by the seed tube or conveyor 214.

The row unit 200 may include a supplement downforce assembly 300, a row cleaner 400 and a trench closing assembly 500. The supplement downforce assembly 300, the row cleaner 400 and the trench closing assembly 500, may be referred to generally as an "agricultural tool".

The supplemental downforce assembly 300 may be the AirForce system available from Precision Planting LLC, 23207 Townline Rd, Tremont, IL 61568, which includes a pneumatic actuator 302 rigidly supported at its upper end by a bracket secured to the toolbar. The other end of the actuator is connected to one of the linkages of the parallel linkage 206. The supplemental downforce assembly 300 may incorporate the fluid control assembly 10 and utilize the fluid system 100A described above, wherein the pneumatic actuator 90A of system 100A corresponds to the actuator 302 and the parallel linkage 206 corresponds to the movable member 99 of system 100A, with fluid supply lines 82, 84 communicating fluid from the fluid tank 80 supported on the toolbar 204 to the respective down chamber and up chamber of the actuator 302 as described in connection with system 100A. Alternatively, the supplemental downforce assembly 300 may utilize the fluid system 100B described above, wherein the actuator 302 corresponds to the airbag 90B of system 100B and the parallel linkage 206 corresponds to the movable member 99. Alternatively, the supplemental downforce assembly 300 may utilize the fluid system 100C described above, wherein the actuator 302 may be replaced by the two airbags 90B-1 and 90B-2 of system 100C and the parallel linkage 206 corresponds to the movable member 99.

The row cleaner 400 includes a pair of rotating wheels 402 supported by forwardly extending arms 404 pivotally connected to the row unit frame 202. An actuator 406 is supported at one end from the row unit frame 202 and is connected at its other end to the arms 404. In operation, the wheels 402 are caused to rotate by engagement with the soil and move debris to either side leaving the soil clear of debris in front of the furrow opening discs 216. The actuator 406 adjusts the downforce on the arm to vary how aggressive the wheels 402 engage with the soil. The row cleaner assembly 400 may be substantially the same as the row cleaner apparatus disclosed in U.S. Pat. No. 9,752,596, incorporated herein in its entirety by reference. The row cleaner 400 may incorporate the fluid control assembly 10 and utilize the fluid system 100A described above, wherein the pneumatic actuator 90A of system 100A corresponds to the actuator identified by reference number "200" in U.S. Pat. No. 9,752,596. A commercial embodiment of the row cleaner disclosed U.S. Pat. No. 9,752,596 is marketed as the CleanSweep, available from Precision Planting LLC, 23207 Townline Rd, Tremont, IL 61568.

The trench closing assembly 500 may be any of the embodiments of the trench closing assembly disclosed in Applicant's co-pending International Patent Application No. PCT/US2019/020452 incorporated herein in its entirety by reference. The trench closing assembly 500 may incorporate the fluid control assembly 10 and utilize the fluid system 100B described above, wherein the pneumatic actuator 90B of system 100B corresponds to the actuator identified by reference number "259" in International Patent Application No. PCT/US2019/020452.

Alternative Fluid Control System

FIGS. 10-16 illustrate an embodiment of an alternative fluid control system 10' suitable for applications where it is down force control only is needed. Thus, in this embodiment, only a down circuit 50' is provided.

Similar to the fluid control assembly 10 described above, the fluid control assembly 10' includes a housing 12' which comprises a top cover 14' and a bottom plate 16'. A plurality of valves 30', 31' (FIGS. 11-12) are mounted to a circuit board 18' received within the top cover 14'. The bottom plate 16' and circuit board 18' include aligned apertures 17', 19' which further align with apertures 21' within posts 20' extending downward from the underside of the top cover 12'. Threaded connectors (not shown) extend through the apertures 17', 19' and into aperture 21' to secure the bottom plate 16' and circuit board 18' to the top cover 14' thereby enclosing the circuit board 18' and valves 30', 32' within the housing 12'.

The top cover 14' includes a communication port 34' for providing data/signal connection with the circuit board 18'. The communication port 34' may receive a connector 35' on the circuit board 18' for mating with a mating connector (not shown) for signal communication with the controller 110 as discussed above. The communication port 34' may be for a 6-pin DT connector, Controller Area Network (CAN) bus connector, USB, Ethernet, RS-232 or any other type of data/signal connector.

The top cover 14' also includes a fluid inlet port 52', an exhaust port 54' and an outlet port 56'. As best viewed in FIGS. 14 and 16, the top cover 14' also includes a down pressure sensor tube 68' in communication with the fluid outlet port 56'. The down pressure sensor tube 68' aligns with and provides communication with a down pressure sensor 69' disposed on the circuit board 18' to detect fluid pressure within the fluid outlet port 56'.

Figure 11:
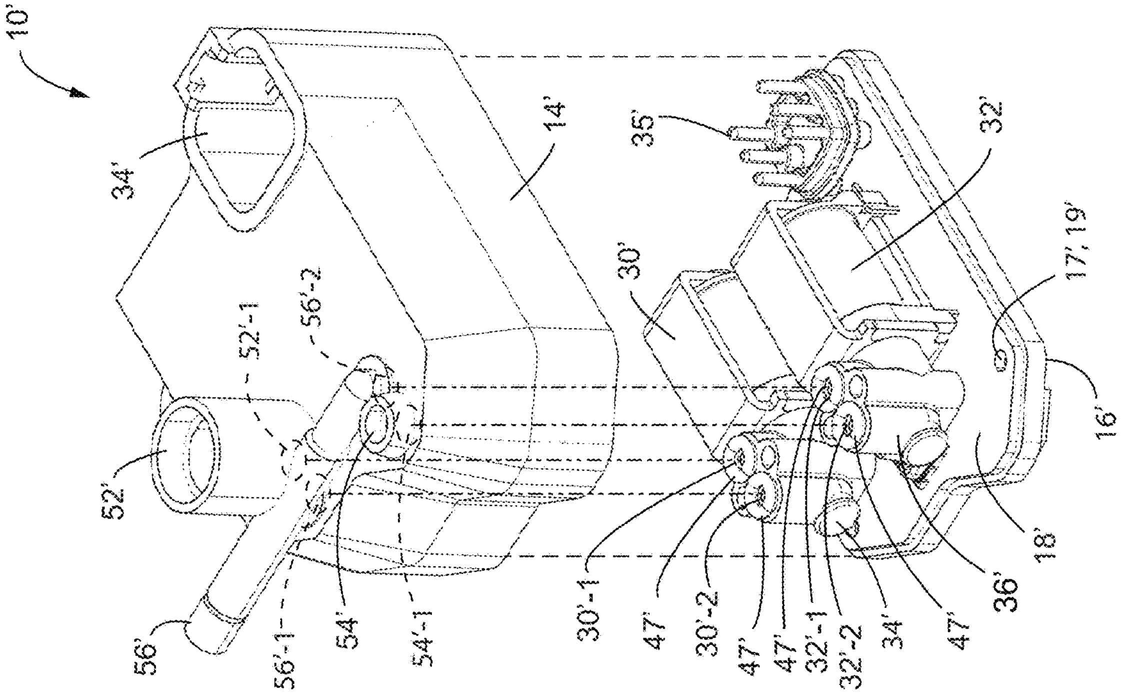
FIG. 11 is an exploded perspective view of the fluid control assembly of FIG. 10.
Figure 10:
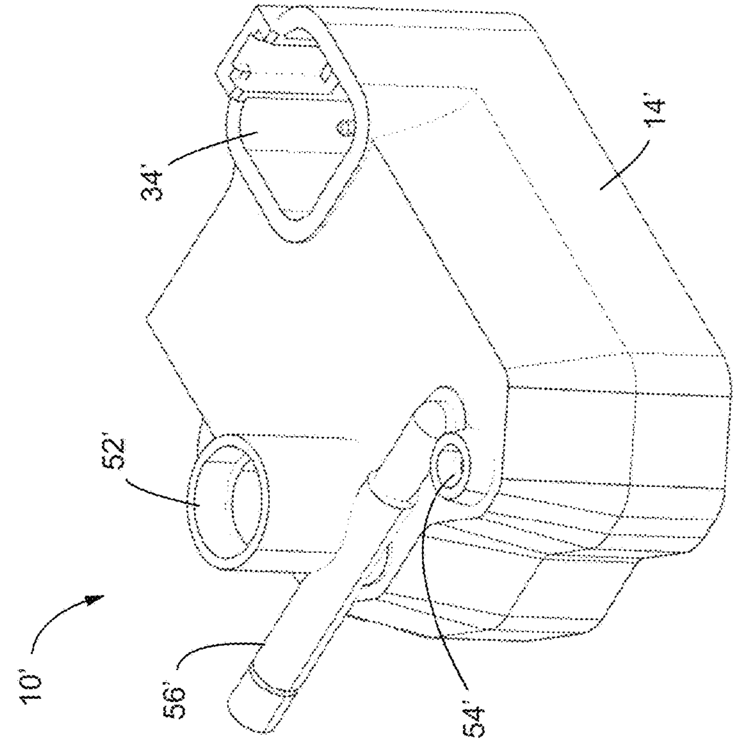
FIG. 10 is a top perspective view of another embodiment of a fluid control assembly.
Figure 12:
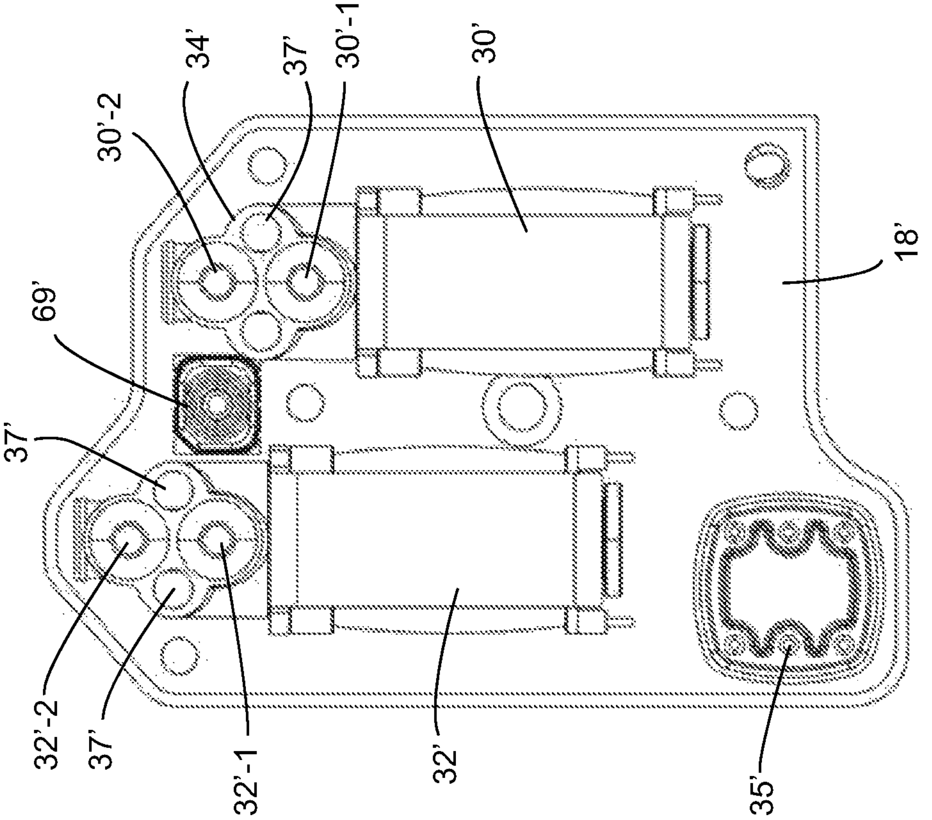
FIG. 12 is a top plan view of the fluid control assembly of FIG. 10 with the top cover removed.
Figure 13:
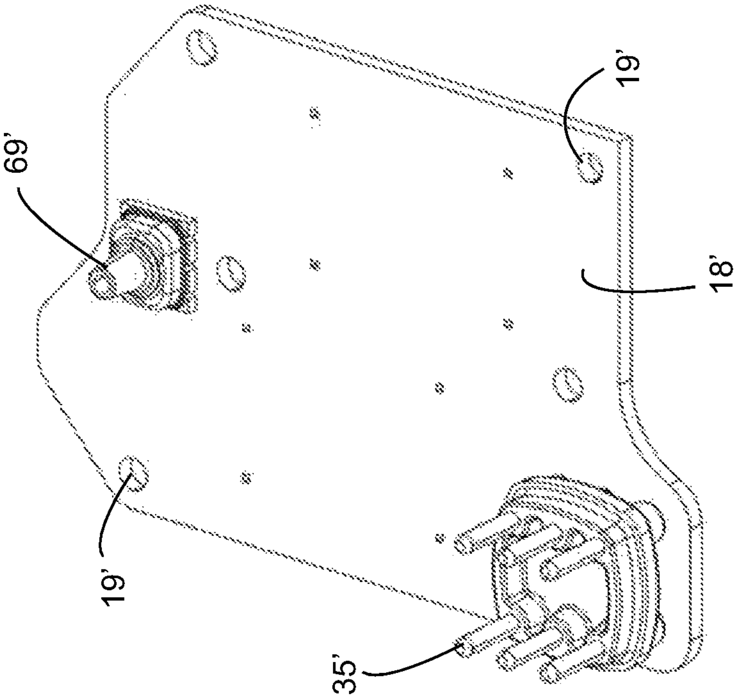
FIG. 13 is a perspective view of the circuit board for the fluid control assembly of FIG. 10 with the valves removed.

Referring to FIG. 11, each of the valves 30', 32' includes a fixture 36' at one end having a pair of longitudinally aligned valve passages 30'-1, 30'-2, 32'-1, 32'-2. The valves 30', 32' may be 2-way pneumatic valves from Asco Valve, Inc., 160 Park Avenue, Florham Park, NJ, 07932 which are in the normally closed position (i.e., so fluid cannot pass between the passage 30'-1 to passage 30'-2 of valve 30' or between passage 32'-1 to passage 32'-2 of valve 32') until energized or actuated, causing the valve to open (i.e., so that fluid may pass between the respective passages 30'-1 to 30'-2 of valve 30' or between respective passage 32'-1 to 32'-2 of valve 32'). The upper end of each fixture 36' also includes alignment holes 37' for alignment with the pegs 38' (FIG. 16) on the underside of the top cover 14' to ensure proper alignment of the valve passages with the corresponding openings of each of the ports 52', 54', 56' in the top cover 14'. A gasket 47' is disposed over the valve passages 30'-1, 30'-2, 32'-1, 32'-2 and seats within the recesses 39' (FIG. 16) in the underside of the top cover 14' surrounding each opening associated with each of the ports 52', 54', 56' thereby providing an airtight seal between the valve passages and the aligned port openings.

Figure 15:
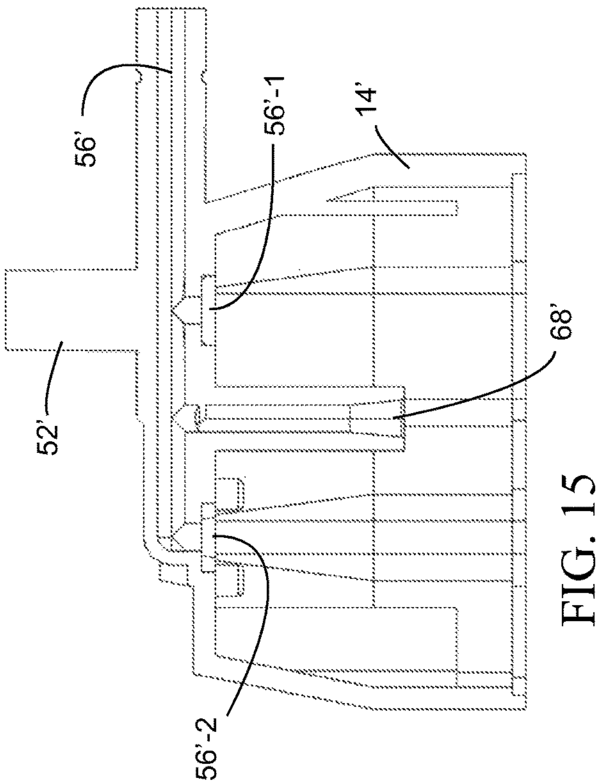
FIG. 15 is an elevation view of a cross-section of the top cover of the fluid control assembly of FIG. 10.
Figure 16:
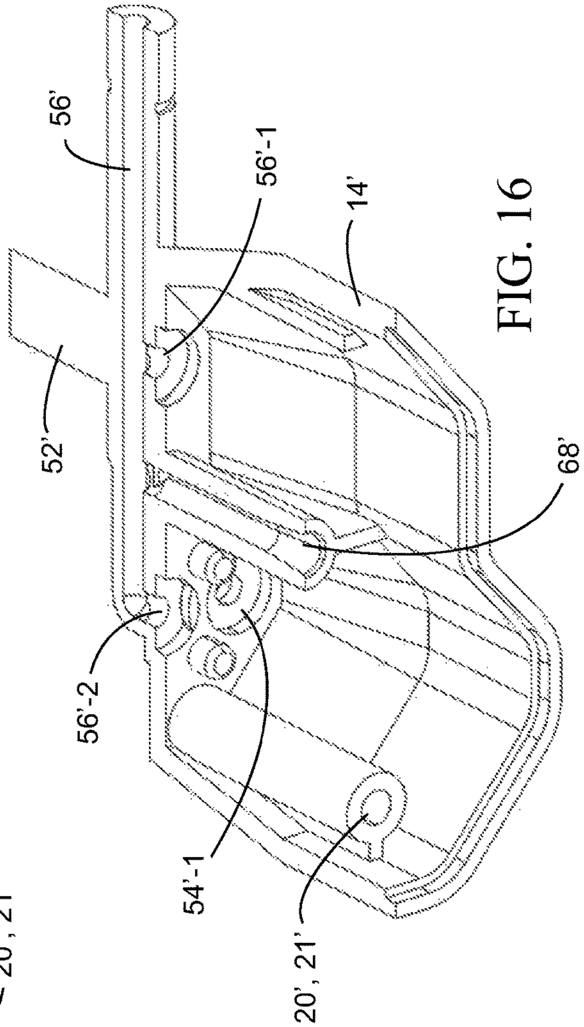
FIG. 16 is a perspective view of a cross-section of the top cover of the fluid control assembly of FIG. 10.
Figure 14:
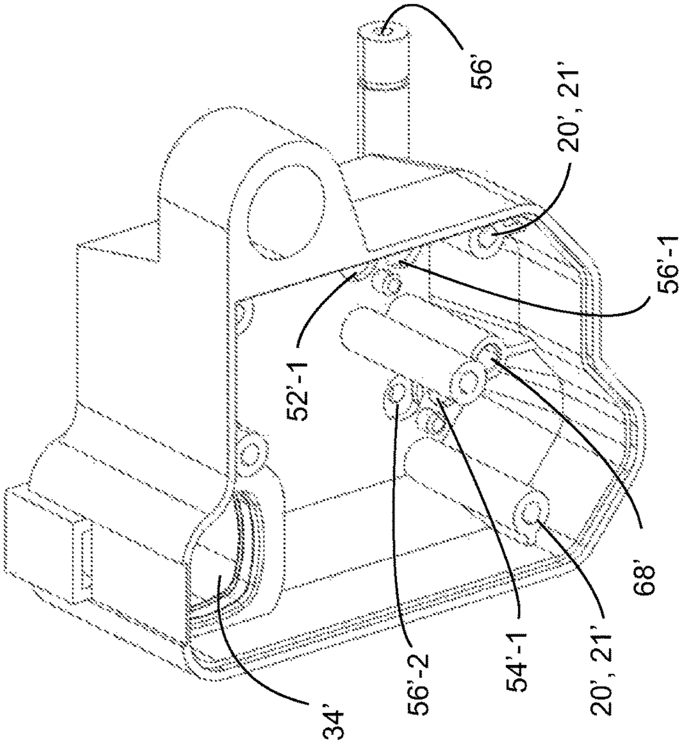
FIG. 14 is a bottom perspective view of the top cover of the fluid control assembly of FIG. 10.

Referring to FIGS. 11 and 15-16, in the down circuit 50', the valve passage 30'-1 of the fluid supply valve 30' aligns with the opening 52'-1 at the bottom of the first fluid inlet port 52'. The other valve passage 30'-2 of the fluid supply valve 30' aligns with the first opening 56'-1 of the first fluid outlet port 56'. The valve passage 32'-1 of the fluid exhaust valve 32' aligns with the second opening 56'-2 of the fluid outlet port 56'. The other valve passage 32'-2 of the fluid exhaust valve 32' aligns with the opening 54'-1 of the exhaust port 54'.

The operation of the fluid control assembly 10' is similar to the operation described above in connection with fluid control assembly 10 (except there is no lift circuit), and therefore only one example of the fluid control system 100' is described below and schematically illustrated in FIGS.

Figure 17A:
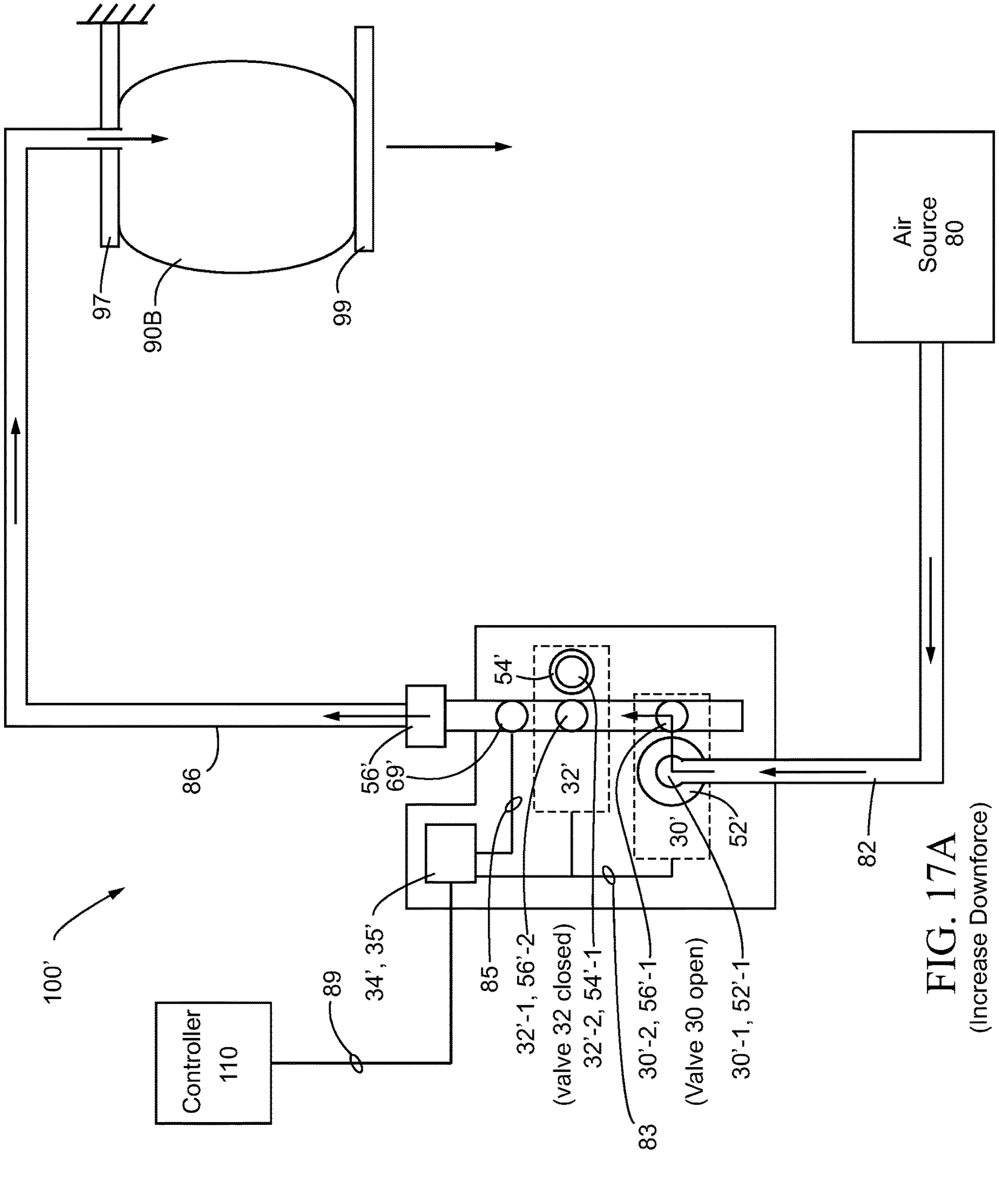
FIGS. 17A and 17B schematically illustrate the operation of a fluid system in which the fluid control assembly of FIG. 10 controls an airbag to increase and decrease downforce, respectively.
Figure 17B:
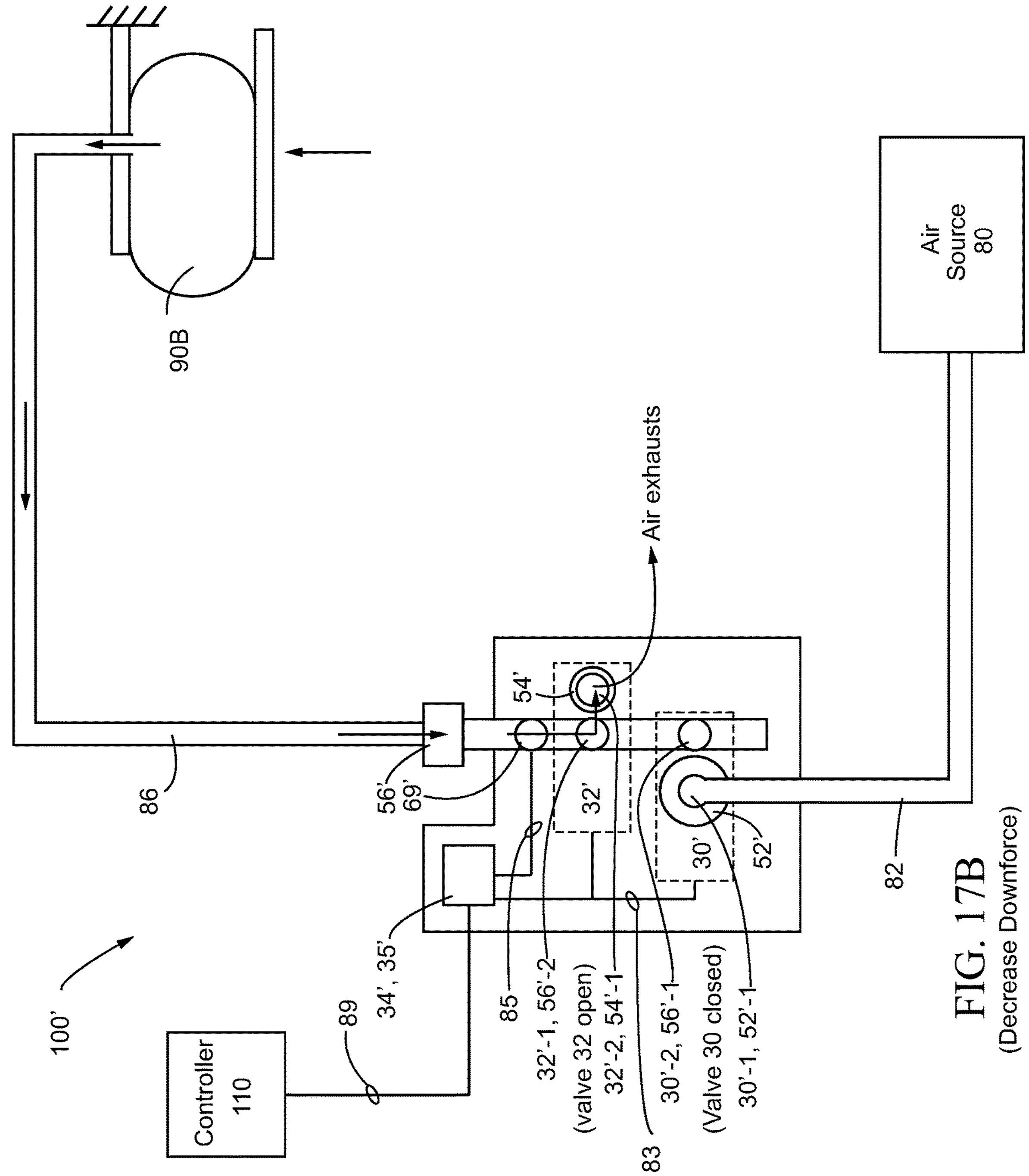

17A-17B. The fluid system 100' comprises the fluid control assembly 10' in communication with a fluid source 80 and one or more pneumatic actuators 90. The fluid source 80 may be a fluid tank with a compressor or other suitable fluid source under pressure. The pneumatic actuator 90 may be a fluid cylinder or a fluid bag. In FIGS. 17-17B, the pneumatic actuator 90 is schematically illustrated as an airbag 90B, which has only a single chamber. One end of the airbag 90B is mounted to the fixed or stationary bracket 97. The other end of the airbag 90B is secured to the movable arm 99. Comparing FIGS. 17A and 17B, it can be seen that when the fluid bag is expanded (FIG. 17A) the expansion of the airbag forces the movable arm downwardly. When the airbag collapses or compresses (FIG. 17B), the movable arm 99 moves upwardly. As previously described, the circuit board 18' includes an electrical trace or signal path 83 between the communication port 34'/connector 35' and each of the valves 30, 32 for signal communication therebetween. The circuit board 18' also includes electrical traces 85 between the communication port 34'/connector 35' and the down pressure sensor 69' for signal communication therebetween. In some embodiments, all processing of signals for control of the valves 30', 32' may be performed by a processor on the circuit board 18'. In other embodiments, a data/signal line 89 may connect a remote controller 110 to the communication port 34'/connector 35' for signal communication of the remote controller 110 with the pressure sensor 69 and valves 30, 32. In yet another alternative embodiment, a closed loop control may be used to control the pressure in the down circuit 50' to selected values set by an operator. In such an embodiment, the selected value may be a selected amount of pressure in the outlet port 56 or the selected value may be a predetermined position of the movable member 99 detected by a position sensor (not shown) disposed detect the position of the movable member 99.

In operation, referring to FIG. 17A, if the down pressure sensor 69' detects that the pressure in the down circuit actuator line 86 is below a predetermined or selected pressure, a signal is generated to open the fluid supply valve 30'. With the fluid supply valve 30' open, the pressurized fluid from the fluid source 80 passes through the supply line 82 and into the inlet port opening 52'-1 of the first valve passage 30'-1 and then into the opening 56'-1 of outlet 56' then out through the actuator line 86 into the airbag 90B, causing the airbag 90B to expand forcing movable arm 99 downwardly. When the down pressure sensor 69 detects that the pressure in the line 86 exceeds a predetermined or set pressure, a signal is generated to close the supply valve 30.

As shown in FIG. 17B, if the down pressure sensor 69 detects that the down pressure in the actuator line 86 exceeds a predetermined or selected pressure, a signal is generated to open the exhaust valve 32' from its normally closed position. With the exhaust valve 32' open, fluid is permitted to exhaust from the airbag 90B through the actuator line 86, through outlet port 56-2 of outlet 56 then through passages 32-1 then through 32-2 of the exhaust valve 32 and then out through exhaust port opening 54-1 of the exhaust port 54 before venting to atmosphere. When the down pressure sensor 69' detects that the pressure in the down circuit actuator line 86 reaches the predetermined or set pressure, a signal is generated to close the exhaust valve 32.

Exemplary uses of the fluid control assembly 10' are for controlling fluid flow for actuating an actuator of any of the foregoing a supplement downforce assembly 300, a row cleaner 400 or a trench closing assembly 500 as described above.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A pneumatic system, comprising:

a pneumatic actuator having a first end and a second end;

a housing defining a first supply port, a first outlet port, a first exhaust port, a second supply port, a second outlet port, and a second exhaust port, the housing further defining a first port opening and a second port opening along the first outlet port, the housing further defining a third port opening and a fourth port opening along the second outlet port;

a first supply line connecting the first supply port to a pneumatic source;

a first actuator line connecting the pneumatic actuator to the first outlet port;

a first pressure sensor disposed to detect a pressure in the first actuator line;

a second supply line connecting the second supply port to the pneumatic source;

a second actuator line connecting the pneumatic actuator to the second outlet port;

a controller in signal communication with the first pressure sensor, the controller generating a supply valve signal if the pressure detected in the first actuator line is less than a predetermined pressure, the controller generating an exhaust valve signal if the pressure detected in the first actuator line is greater than the predetermined pressure;

a first supply valve received within the housing, the first supply valve disposed in a normally closed position, the first supply valve responsive to the supply valve signal generated by the controller to change from the normally closed position to an open position, the first supply valve including a first supply valve inlet and a first supply valve outlet, the first supply valve inlet in communication with the first supply port, the first supply valve outlet in communication with the first port opening along the first outlet port, whereby, with the first supply valve in the normally closed position, gas is unable to pass between the first supply valve inlet and the first supply valve outlet;

a second supply valve received within the housing, the second supply valve disposed in a normally closed position, the second supply valve responsive to the supply valve signal generated by the controller to change from the normally closed position to an open position, the second supply valve including a second supply valve inlet and a second supply valve outlet, the second supply valve inlet in communication with the second supply port, the second supply valve outlet in communication with the third port opening along the second outlet port, whereby, with the second supply valve in the normally closed position, gas is unable to pass between the second supply valve inlet and the second supply valve outlet;

a first exhaust valve received within the housing, the first exhaust valve disposed in normally closed position, the first exhaust valve responsive to the exhaust valve signal generated by the controller to change from the normally closed position to an open position, the first exhaust valve including a first exhaust valve inlet and a first exhaust valve outlet, the first exhaust valve inlet in communication with the second port opening along the first outlet port, the first exhaust valve outlet in communication with the first exhaust port, whereby, with the first exhaust valve in the normally closed position, gas is unable to pass between the first exhaust valve inlet and the first exhaust valve outlet;

a second exhaust valve received within the housing, the second exhaust valve disposed in a normally closed position, the second exhaust valve responsive to the exhaust valve signal generated by the controller to change from the normally closed position to an open position, the second exhaust valve including a second exhaust valve inlet and a second exhaust valve outlet, the second exhaust valve inlet in communication with the fourth port opening along the second outlet port, the second exhaust valve outlet in communication with the second exhaust port, whereby, with the second exhaust valve in the normally closed position, gas is unable to pass between the second exhaust valve inlet and the second exhaust valve outlet;

whereby, when the first pressure sensor detects the pressure in the first actuator line is less than the predetermined pressure, the controller generates the supply valve signal to change each of the first supply valve and the second supply valve from the normally closed position to the open position, whereupon:

gas flows from the pneumatic source via the first supply line into the first supply port, then into the first supply valve inlet, then through the open first supply valve into the first supply valve outlet, then into the first outlet port through the first port opening, then through the first actuator line and into the pneumatic actuator; and gas flows from the pneumatic source via the second supply line into the second supply port, then into the second supply valve inlet, then through the open second supply valve into the second supply valve outlet, then into the second outlet port through the third port opening, then through the second actuator line and into the pneumatic actuator;

thereby expanding the pneumatic actuator while the first exhaust valve and the second exhaust valve are in the normally closed position.

2. The pneumatic system of claim 1, whereby, when the first pressure sensor detects the pressure in the first actuator line is greater than the predetermined pressure, the controller generates the exhaust valve signal to change each of the first exhaust valve and the second exhaust valve from the normally closed position to the open position, whereupon:

gas flows from the pneumatic actuator via the first actuator line into the first outlet port, then through the second port opening into the first exhaust valve inlet, then through the open first exhaust valve into the first exhaust valve outlet, and then out through the first exhaust port; and gas flows from the pneumatic actuator via the second actuator line into the second outlet port, then through the fourth port opening into the second exhaust valve inlet, then through the open second exhaust valve into the second exhaust valve outlet, and then out through the second exhaust port;

thereby collapsing the pneumatic actuator while the first supply valve and the second supply valve are in the normally closed position.

3. In combination, the pneumatic system of claim 1 and an agricultural planter, the agricultural planter including a parallel linkage supporting a row unit from a toolbar, wherein the first end of the pneumatic actuator is operably supported on the toolbar and the second end of the pneumatic actuator is operably secured to the parallel linkage, whereby the expansion of the pneumatic actuator exerts a down force on the row unit.

4. In combination, the pneumatic system of claim 2 and an agricultural planter, the agricultural planter including a parallel linkage supporting a row unit from a toolbar, wherein the first end of the pneumatic actuator is operably supported on the toolbar and the second end of the pneumatic actuator is operably secured to the parallel linkage, whereby the collapsing of the pneumatic actuator exerts a lift force on the row unit.

5. In combination, the pneumatic system of claim 1 and an agricultural planter, the agricultural planter including a row cleaner assembly disposed forward of a row unit of the agricultural planter, and wherein the first end of the pneumatic actuator is operably supported on the row unit and the second end of the pneumatic actuator is operably secured to the row cleaner assembly, whereby the expansion of the pneumatic actuator exerts a down force on the row cleaner assembly.

6. In combination, the pneumatic system of claim 2 and an agricultural planter, the agricultural planter including a row cleaner assembly disposed forward of a row unit of the agricultural planter, and wherein the f first end of the pneumatic actuator is operably supported on the row unit and the second end of the pneumatic actuator is operably secured to the row cleaner assembly, whereby the collapsing of the pneumatic actuator exerts a lift force on the row cleaner assembly.

7. In combination, the pneumatic system of claim 1 and an agricultural planter, the agricultural planter including a trench closing assembly disposed rearward of a row unit of the agricultural planter, and wherein the first end of the pneumatic actuator is operably supported on the row unit and the second end of the pneumatic actuator is operably secured to the trench closing assembly, whereby the expansion of the pneumatic actuator exerts a down force on the trench closing assembly.

8. In combination, the pneumatic system of claim 2 and an agricultural planter, the agricultural planter including a trench closing assembly disposed rearward of a row unit of the agricultural planter, and wherein the first end of the pneumatic actuator is operably supported on the row unit and the second end of the pneumatic actuator is operably secured to the trench closing assembly, whereby the collapsing of the pneumatic actuator exerts a lift force on the trench closing assembly.

* * * * *